(12) United States Patent
Schwarz et al.

(10) Patent No.: US 8,376,644 B2
(45) Date of Patent: Feb. 19, 2013

(54) METALLIC INK AND APPLICATOR FOR APPLYING THE INK

(75) Inventors: Wolfgang Schwarz, Ansbach (DE); Gerhard Lugert, Nürnberg (DE)

(73) Assignee: Faber-Castell AG, Stein (DE)

( * ) Notice: Subject to any disclaimer, the term of this patent is extended or adjusted under 35 U.S.C. 154(b) by 270 days.

(21) Appl. No.: 13/012,028

(22) Filed: Jan. 24, 2011

(65) Prior Publication Data

US 2011/0182651 A1     Jul. 28, 2011

(30) Foreign Application Priority Data

Jan. 22, 2010  (EP) .................................. 10151479

(51) Int. Cl.
 *B43K 8/06* (2006.01)
(52) U.S. Cl. .................... 401/199; 106/31.6; 106/31.65; 106/31.28; 523/161
(58) Field of Classification Search ............... 401/198, 401/199; 106/31.6, 31.65, 31.28, 31.86; 523/161, 200, 205
See application file for complete search history.

(56) References Cited

U.S. PATENT DOCUMENTS

| | | | |
|---|---|---|---|
| 4,545,819 A | 10/1985 | Shioi et al. | |
| 4,657,591 A | 4/1987 | Shioi et al. | |
| 5,037,475 A | 8/1991 | Chida et al. | |
| 7,273,842 B1 * | 9/2007 | VanDyk et al. | 510/475 |
| 7,307,110 B2 * | 12/2007 | Yatake | 523/160 |
| 7,655,082 B2 | 2/2010 | Zhu | |
| 7,981,210 B2 * | 7/2011 | Kwan et al. | 106/31.86 |

FOREIGN PATENT DOCUMENTS

| WO | 2008/101146 A1 | 8/2008 |
|---|---|---|
| WO | 2009/144005 A1 | 12/2009 |

* cited by examiner

*Primary Examiner* — David Walczak
(74) *Attorney, Agent, or Firm* — Laurence A. Greenberg; Werner H. Stemer; Ralph E. Locher

(57) ABSTRACT

A metallic ink includes 30% to 80% water, 0.4% to 10% color pigments having a particle size $\leq 6$ μm, 1% to 15% dissolved resin from the group consisting of maleate resin and/or maleic acid modified rosin, 1% to 15% metallic pigments having a particle size distribution D50<25 μm, 1% to 20% humectants, 0.1% to 10% additives and a viscosity of 5-10 mPa·s (Brookfield, CPE-40 spindle, 20 rpm). An applicator for applying the ink is also provided.

4 Claims, 1 Drawing Sheet

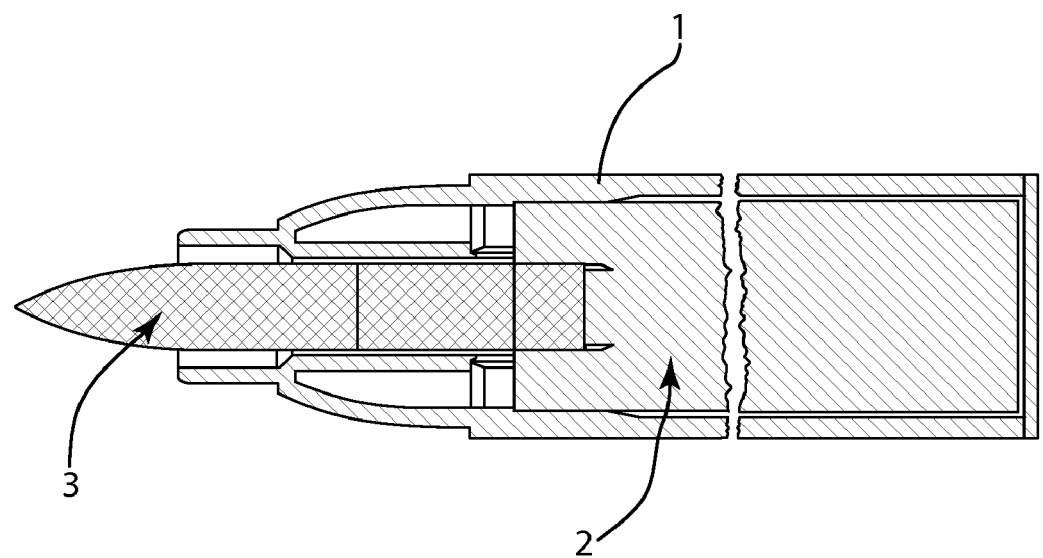

METALLIC INK AND APPLICATOR FOR APPLYING THE INK

CROSS-REFERENCE TO RELATED APPLICATION

This application claims the priority, under 35 U.S.C. §119, of European Patent Application EP 10 151 479, filed Jan. 22, 2010; the prior application is herewith incorporated by reference in its entirety.

BACKGROUND OF THE INVENTION

Field of the Invention

The invention relates to a colored, waterborne, writing, marking and drawing liquid including metal pigments for use in capillary applicators, i.e., pens for example, including an applying member, a writing tip, made of a capillary material and an ink storage device containing precisely such material. The invention also relates to an applicator for applying the ink. The capillary material, which is formed of fibers or a sintered material, for example, is traversed by a multiplicity of very fine channels in which the ink is transported due to forces of adhesion or the capillary effect. In order to ensure that the capillary channels may not clog, the color and metal pigments being used have to be relatively small. When such an ink is applied to a typical paper substrate using the applicator, there is a danger that the color pigment particles will migrate, together with the solvent, into the paper substrate which has pores comparable to the channels in the capillary material. The metal particles in the ink have, if any, a significantly weaker tendency to migrate, which is attributable inter alia to the leaflet structure of the metal particles. The paper surface therefore becomes depleted of color pigment, and therefore the actually desired hue fades or completely disappears. That effect is particularly pronounced, for example in the case of inks including blue pigments, for example phthalocyanine pigments, and aluminum particles, which are applied to black papers (for example Canson reference 4331659 colored drawing paper at 125 g/m[10]). The blue hue disappears almost completely in that case, resulting in a merely silvery hue that turns gray in parts.

SUMMARY OF THE INVENTION

It is accordingly an object of the invention to provide a metallic ink and an applicator for applying the ink, which overcome the hereinafore-mentioned disadvantages of the heretofore-known inks and devices of this general type and in which the metallic ink is improved with regard to any migration of its color pigments into an absorbent paper substrate.

With the foregoing and other objects in view there is provided, in accordance with the invention, a metallic ink, comprising 30% to 80% water, 1% to 15% dissolved maleate resin i.e. a resin from the group consisting of maleate resin and/or maleic acid modified rosin, 0.4% to 10% color pigments, 1% to 15% metallic pigments having a particle size distribution D50<25 μm, 1% to 20% humectants and 0.2% to 12% additives and a viscosity of 5 to 10 mPa·s (Brookfield, CPE-40 spindle, 20 rpm). This results in the following base formulation:

| | |
|---|---|
| maleate resin | 1 to 15% |
| water | 30 to 80% |
| humectants such as glycerol or glycols | 1 to 20% |
| metal pigments | 1 to 15% |
| (particle size distribution D50 < 25 μm) | |
| color pigments | 0.4 to 10% |
| additives such as wetters, dispersants, corrosion inhibitors | 0.1 to 10% |
| preservatives | 0.1 to 2% |
| at a viscosity of 5-10 mPa·s. | |

The ink constituent which is decisive for improved migration behavior includes the maleate resins present in the aqueous matrix in dissolved form. Due to the noneventuating or at least reduced migration of particles, the original hue is retained or fades less than is the case with inks which do not contain the maleate resins mentioned. When the maleate resin content of an ink is less than 1%, particle migration is only reduced to an extent that, compared with an ink without maleate resin, there is no discernible effect to the naked eye. On the other hand, contents above 10% are not observed to yield any further improvement in migration behavior. Maintaining a viscosity of 5-10 mPa·s (Brookfield, CPE-40 spindle, 20 rpm) and using metal pigments having a particle size distribution D50<25 μm ensure the capillary transportability of the ink.

Resin 1:

One of the maleate resins according to the present invention is a so-called maleic acid modified rosin, i.e., a rosin to which maleic acid is bound in such a way that a resin having an acid number (German Industrial Standard DIN 53402) of 125 to 145 mg KOH/g results. The resins used additionally include the following further specification:

| | |
|---|---|
| melting point (Kofler hot stage, 6 min): | 125 ± 10° C. |
| viscosity (efflux time 60% ethanol/20° C.; 4DIN53211): | 80-140 s |
| acid number (DIN 53402): | 125-145 mg KOH/g |
| color number (Gardener Colour Standard, 50% K-30 ASTMD1544): | ≦11 |
| Density of raw material at 20° C. (approx): | 1.1 g/cm³ |

Such resin is, for example, available under a trademark Erkamar® 3140[1].

Resin 2:

The other resin is a modified, oxidation-stable maleate resin of the following specification:

| | |
|---|---|
| melting point (Kofler hot stage, 6 min): | 135 ± 10° C. |
| viscosity (efflux time 60% ethanol/20° C.; 4DIN53211): | 75-125 s |
| acid number (DIN 53402): | 165-200 mg KOH/g |
| color number (Gardener Colour Standard, 50% ethanol ASTMD 1544): | ≦10 |
| density (supply form 20° C.): | approx. 1.1 g/cm³ |
| hydroxyl number: | approx. 140 mg KOH/g |

Such resin is available, for example, under a trademark Erkamar® 4170[1].

The herein discussed migration of color pigments is also reduced as a result of water being used and not an organic solvent. This is because organic solvents have a propensity, particularly in the case of thin papers, to "strike through," i.e., they penetrate relatively rapidly through the paper, and in the process transport color pigments into the paper.

Using resin 1 and/or resin 2 also eliminates a further disadvantage of conventional metallic inks, namely their tendency to throw a sediment, i.e., the effect that metal and color pigment particles, particularly following prolonged storage, will settle out of the solution—in spite of dispersing assistants typically included in the ink—and form a sediment. There is a danger in that case that the metal and color pigments will clog the capillary channels in the liquid storage device and the applying element. An ink that is in accordance with the present invention thus controls two negative effects of conventional inks, i.e., the disappearance/fading of the color through color pigment migration and the sedimentation of particles, particularly metal pigments.

A particularly durable dispersion of the metal particles, more particularly of the preferred aluminum particles, and of the color pigments, is achieved through addition of an organophosphorus compound (for example Nuosperse® FA 196[2]). The disadvantageous effects described are thus best reduced or entirely prevented when the metallic ink contains at least one of the resins mentioned and an organophosphorus compound.

Useful color pigments include virtually all customary pigments suitable and licensed for writing and painting applications, for example Flexiverse® pigments[9], Hostafine® pigments and Euronyl® standard pigments, having a particle size $\leq 6$ μm for capillary transportability. In order to improve the stability of the inks and also to facilitate dispersal, high molecular weight block copolymers having pigment affinity groups are used as dispersing assistants. The particle size distribution of the metal pigments used (aluminum, gold, copper or bronze) should be $D_{50} < 25$ μm in order—as already mentioned above—to ensure capillary transportability. Particularly in the case of aluminum as metal pigment, it is advisable to use a so-called corrosion inhibitor, for example 1,2,3-benzotriazole, in the presence of water. The use of maleate resins combined with organophosphorus compounds will prove to be particularly advantageous.

In order to prevent drying out of the ink during the storage time of an applicator or else during use particularly in the region of the applying element, a humectant, for example glycol, glycerol, 1,2-propanediol, 1,3-butanediol, 1-methoxy-2-propanol, is included. A further additive present in the case of readily oxidizable metals such as aluminum is a corrosion inhibitor such as 1,2,3-benzotriazole, to prevent the reaction with water. The ink further includes a preservative, for example Bodoxin® or Bodoxin® AH, to inhibit microbial contamination. The inks have a pH of about 7 to about 9, i.e., are neutral or slightly basic. If necessary, an alkalizing agent, for example triethanolamine, is added to the ink to adjust the pH.

With the objects of the invention in view, there is concomitantly provided an applicator, comprising a writing tip made of a capillary material and an ink storage device containing such a material and a metallic ink according to the invention.

Other features which are considered as characteristic for the invention are set forth in the appended claims.

Although the invention is illustrated and described herein as embodied in a metallic ink and an applicator for applying the ink, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a diagrammatic, longitudinal-sectional view of a capillary applicator, with which exemplary embodiments of the invention will be more particularly described.

DETAILED DESCRIPTION OF THE INVENTION

The exemplary embodiments which follow (see table below) specify inks containing either resin 1 or resin 2. Comparative examples V1 and V2 concern inks which, instead of a maleate resin of the type according to the present invention, contain a polyester resin (resin 3) or an acrylate resin (resin 4), but otherwise have a composition comparable to examples 1 to 5.

Resin 3:

Light-colored, saturated ethanol- or alkali-soluble polyester resin having carboxyl and hydroxyl end groups;

| | |
|---|---|
| melting point (Kofler hot stage, 6 min): | 65 ± 5° C. |
| viscosity | 30-70 s |
| (efflux time 60% ethanol/20° C.; DIN 53211): | |
| acid number DIN 53402 | 100-120 mg KOH/g |
| iodine color number: 50% ethanol DIN6162 | $\leq 2$ mgI/100 ml |
| density of raw material at 20° C. | approx. 1.2 g/cm$^3$ |

Resin 4:

| | |
|---|---|
| acrylate resin (e.g. Joncryl ® 680 [8],) | |
| molecular weight | 4,500 |
| acid number (DIN53402) | 215 mg KOH/g |
| density at 25° C. | approx. 1.1 gr/cm$^3$ |
| glass transition temperature Tg (DSC) | 91° C. |

In order to prepare the inks, their constituents are introduced into suitable vessels, for example into glass containers, and intensively mixed together through the use of stirring tools. The inks thus obtained were filled into applicators (markers) having a fiber storage device of low density and a customary fiber tip.

The color pigments mentioned in the examples are available as pigment preparations having a solids content of about 40%, and are added as such to the inks in the course of preparation thereof. The corresponding content particulars in the examples are based on the solids content.

Examples

|  | 1 | 2 | 3 | 4 | 5 | V1 | V2 |
|---|---|---|---|---|---|---|---|
| Resin 1 | — | 5.0% | 5.0% | 5.0% | — | — | — |
| Resin 2 | 5.0% | — | — | — | 5.0% | — | — |
| Resin 3 | — | — | — | — | — | 5.0% | — |
| Resin 4 | — | — | — | — | — | — | 5.0% |
| 1-Methoxy-2-propanol | 5.0% | 5.0% | 5.0% | 5.0% | 5.0% | 5.0% | 5.0% |
| Triethanolamine | 5.05% | 3.95% | 3.95% | 3.95% | 6.0% | 3.25% | 6.05% |
| Water, demineralized | 62.5% | 63.6% | 64.4% | 65.0% | 65.05% | 64.3% | 61.5% |
| Glycerol | 7.0% | 7.0% | 6.0% | — | — | 7.0% | 7.0% |
| 1,2-Propanediol | — | — | — | 7.0% | — | — | — |
| 1,3-Butanediol | — | — | — | — | 7.0% | — | — |
| Bodoxin AH | 0.7% | 0.7% | 0.7% | 0.7% | 0.7% | 0.7% | 0.7% |
| Bodoxin | 0.2% | 0.2% | 0.2% | 0.2% | 0.2% | 0.2% | 0.2% |
| Nuosperse FA 196[2] | 0.8% | 0.8% | 0.8% | — | 0.8% | 0.8% | 0.8% |
| Hostafine Yellow HR[3] | — | — | 6.0% | — | — | — | — |
| Hostafine Ruby F6B[3] | — | — | — | 7.2% | — | — | — |
| Hostafine Blue B2G[3] | 6.8% | 6.8% | — | — | — | 6.8% | 6.8% |
| Euronyl Standard Green 650[4] | — | — | — | — | 6.8% | — | — |
| 1,2,3-Benzotriazole | 0.25% | 0.25% | 0.25% | 0.25% | 0.25% | 0.25% | 0.25% |
| Disperbyk 190[5] | 0.70% | 0.70% | 0.7% | 0.7% | 0.7% | 0.70% | 0.70% |
| Stapa Hydroxal 2W 4000 aluminum paste[6] | 6.0% | 6.0% | 7.0% | 5.0% | — | 6.0% | 6.0% |
| Aquaral 6252/63 W aluminum paste[7] | — | — | — | — | 2.5% | — | — |
| Experimental results | | | | | | | |
| Sedimentation stability after 4 weeks | + | + | + | 0 | + | 0 | 0 |
| Color metallic effect on black paper | + | ++ | ++ | + | + | − | 0 |

Referring now in detail to the single FIGURE of the drawing, there is seen a longitudinal-sectional view of a capillary applicator (marker) into which the inks indicated in the above table were introduced directly in their as-prepared state to test the sedimentation stability of the inks. The applicator is substantially pen-shaped and includes a shaft 1 which contains a polyester fiber storage device 2 of low density. The front end of the pen carries a fiber tip 3 having a back end which communicates with the fiber storage device 2, or projects into the latter. An applicator of this type was used to make drawdowns, strokes or applications on a paper substrate to test the flow of the inks through the fiber tip. This test was repeated after 4 weeks. The result is reproduced in the penultimate column of the table. Reference symbol "0" is to be taken as meaning that a significant sedimentation and a worse ink flow is observed. This was the case with comparative examples V1 and V2, which respectively contain a polyester resin (resin 3) and an acrylate resin (resin 4), but not the resins of the present invention. Inks Nos. 1, 2, 3 and 5, by contrast, exhibited good (+) sedimentation stability. In the case of ink No. 4, the organophosphorus compound was omitted, which induced a sedimentation similar to the inks of the comparative examples. The combination of this compound with resin 1 or resin 2 thus appears to have a sedimentation stability enhancing effect.

In order to test color pigment migration, the above-mentioned applicator was used to make drawdowns, strokes or applications on a black paper substrate (125 g/m² colored drawing paper, Canson reference 4331659[10]) and, following a delay time of a few seconds, the color of the drawdown, stroke or application was assessed. As is shown in the last column of the table, all of the inks of the present invention give a good (+) to very good (++) result, i.e. the respective color was more or less distinctly perceptible. Only ink No. 4 (no organophosphorus compound) has a somewhat less intensive color as compared with the inks likewise containing resin 1. The experimental result further reveals that the best results with respect to the migration of the color pigments into the paper substrate are achieved with resin 1. As far as inks V1 and V2 are concerned, in this case a relatively strong migration of the color pigments into the paper is observed, i.e. the original color of the ink has faded strongly (0) or very strongly on the black paper surface and is virtually no longer visible (−) thereon.

Manufacturers:
1) Robert Kramer GmbH and Co, D-27755 Delmenhorst, Germany
2) Elementis, B-1831 Diegem, Belgium
3) Clariant, Frankfurt/Main, Germany 4) Scholz Farben-Fabrikation, D-45665 Recklinghausen, Germany
5) Byk Chemie, D-46483 Wesel, Germany
6) Eckart GmbH, D-90763 Furth, Germany
7) Benda-Lutz Werke, A-3133 Traismauer, Austria
8) BASF Nederland B.V., Postfach 390, NL-8400 AJ Heerenveen, Netherlands
9) Sun Chemical, Amelia, Ohio 45102, USA
10) Canson Papier, F-14200 Hérouville St.-Clair, France

The invention claimed is:

1. A metallic ink, comprising:
   30% to 80% water;
   0.4% to 10% color pigments having a particle size $\leqq 6$ μm;
   1% to 15% dissolved resin from the group consisting of maleate resin and/or maleic acid modified rosin;
   1% to 15% metallic pigments having a particle size distribution D50<25 μm;
   1% to 20% humectants;
   0.1% to 10% additives; and
   a viscosity of 5-10 mPa·s (Brookfield, CPE-40 spindle, 20 rpm).

2. The metallic ink according to claim 1, which further comprises an organophosphorus compound as a dispersing assistant.

3. The metallic ink according to claim 1, which further comprises aluminum pigments.

4. An applicator, comprising:
   a writing tip made of a capillary material; and
   an ink storage device containing the capillary material and a metallic ink according to claim 1.

* * * * *